(12) United States Patent
Ahuja et al.

(10) Patent No.: US 10,129,227 B2
(45) Date of Patent: Nov. 13, 2018

(54) SENSOR DATA COLLECTION, PROTECTION, AND VALUE EXTRACTION

(71) Applicant: McAfee, LLC, Santa Clara, CA (US)

(72) Inventors: Ratinder Ahuja, Santa Clara, CA (US); Dmitri Rubakha, Santa Clara, CA (US); Philip B. Tricca, Sunnyvale, CA (US); Samir Shah, Santa Clara, CA (US)

(73) Assignee: MCAFEE, LLC, Santa Clara, CA (US)

( * ) Notice: Subject to any disclaimer, the term of this patent is extended or adjusted under 35 U.S.C. 154(b) by 125 days.

(21) Appl. No.: 14/757,598

(22) Filed: Dec. 23, 2015

(65) Prior Publication Data

US 2017/0187696 A1   Jun. 29, 2017

(51) Int. Cl.
| | |
|---|---|
| H04L 29/06 | (2006.01) |
| H04L 29/08 | (2006.01) |
| H04W 4/38 | (2018.01) |
| H04W 4/00 | (2018.01) |

(52) U.S. Cl.
CPC .......... *H04L 63/06* (2013.01); *H04L 67/16* (2013.01); *H04L 67/2804* (2013.01); *H04L 67/2809* (2013.01); *H04W 4/006* (2013.01); *H04W 4/38* (2018.02)

(58) Field of Classification Search
None
See application file for complete search history.

(56) References Cited

U.S. PATENT DOCUMENTS

| | | | | |
|---|---|---|---|---|
| 8,301,635 B2 * | 10/2012 | de la Iglesia | ........... | G06F 21/64 707/741 |
| 8,364,680 B2 * | 1/2013 | Bilbrey | ........... | G06F 3/03545 707/737 |
| 2006/0209868 A1 * | 9/2006 | Callaghan | ........... | G06Q 10/00 370/428 |
| 2006/0280181 A1 * | 12/2006 | Brailas | ........... | G06K 7/10099 370/392 |
| 2007/0112825 A1 * | 5/2007 | Cook | ........... | G06F 17/30489 |
| 2012/0030263 A1 * | 2/2012 | John | ........... | G06F 17/30038 707/825 |
| 2012/0197852 A1 * | 8/2012 | Dutta | ........... | H04L 67/2804 707/692 |
| 2012/0197856 A1 * | 8/2012 | Banka | ........... | H04L 67/12 707/706 |
| 2012/0197898 A1 * | 8/2012 | Pandey | ........... | G06F 17/30333 707/741 |

(Continued)

FOREIGN PATENT DOCUMENTS

| | | |
|---|---|---|
| WO | 2015006080 A1 | 1/2015 |
| WO | 2015164359 A1 | 10/2015 |

OTHER PUBLICATIONS

Alagheband et al., Dynamic and secure key management model for hierarchical heterogeneous sensor networks, IET information security, Dec. 2011, 10 pages (Year: 2011).*

(Continued)

*Primary Examiner* — Jeffrey C Pwu
*Assistant Examiner* — Baotram Tran
(74) *Attorney, Agent, or Firm* — Hanley, Flight & Zimmerman, LLC (57) ABSTRACT

Data aggregation includes receiving, from an electronic device, a plurality of sensor data packets, wherein the plurality of sensor data packets are received from at least one sensor of the electronic device, and wherein each of the plurality of sensor data packets comprise a tag identifying a classification of the sensor data in the sensor data packet, applying a user-specific policy to the plurality of sensor data packets, aggregating the plurality of sensor data packets based on the user-specific policy to obtain aggregated sensor data, and transmitting the aggregated sensor data to a service broker.

23 Claims, 5 Drawing Sheets

(56) References Cited

U.S. PATENT DOCUMENTS

| | | | |
|---|---|---|---|
| 2013/0222133 A1* | 8/2013 | Schultz | G08G 1/205 340/539.13 |
| 2013/0276144 A1* | 10/2013 | Hansen | G06F 21/60 726/29 |
| 2013/0290305 A1 | 10/2013 | Feng et al. | |
| 2014/0085083 A1* | 3/2014 | Sabeta | G06K 19/07758 340/539.12 |
| 2014/0189878 A1* | 7/2014 | Michio | G06F 21/608 726/26 |
| 2014/0344269 A1* | 11/2014 | Dong | H04L 67/12 707/736 |
| 2015/0067176 A1* | 3/2015 | Dubois | H04L 69/08 709/227 |
| 2015/0074110 A1* | 3/2015 | Paek | G06Q 50/10 707/737 |
| 2016/0188873 A1* | 6/2016 | Smith | G06F 21/53 726/22 |
| 2016/0269418 A1* | 9/2016 | Sangary | H04L 63/105 |
| 2016/0294829 A1* | 10/2016 | Angus | H04L 63/0876 |
| 2016/0379282 A1* | 12/2016 | Hill | G06Q 50/01 705/26.1 |

OTHER PUBLICATIONS

Liu et al., Establishing Pairwise Keys in Distributed Sensor Networks, ACM 2005, 37 pages (Year: 2005).*
Luk et al., MiniSec: A Secure Sensor Network Communication Architecture, ACM 2007, 10 pages (Year: 2007).*
Manzo et al., Time Synchronization Attacks in Sensor Networks, ACM 2005, 10 pages (Year: 2005).*
Shim et al., A Secure Data Aggregation Scheme Based on Appropriate Cryptographic Primitives in Heterogeneous Wireless Sensor Networks, IEEE 2014, 12 pages (Year: 2014).*
Winkler et al., Security and Privacy Protection in Visual Sensor Networks: A Survey, ACM 2014, 42 pages (Year: 2014).*
Zhu et al., An Efficiency Policy System for Body Sensor Networks, IEEE 2008, 8 pages (Year: 2008).*
PCT International Search Report and Written Opinion received in corresponding PCT Application No. PCT/US2016/063091, dated Mar. 9, 2017, 13 pages.
International Bureau, "International Preliminary Report on Patentability," issued in connection with application No. PCT/US2016/063091, dated Jun. 26, 2018, 13 pages.

* cited by examiner

SENSOR DATA COLLECTION, PROTECTION, AND VALUE EXTRACTION

TECHNICAL FIELD

Embodiments described herein generally relate to data collection, and more specifically to sensor data collection, protection and value extraction.

BACKGROUND ART

Today's technology allows for media content to be enjoyed over a number of computer devices. Such devices may include, for example, personal computers, laptops, television devices, cell phones, tablets, smart watches, and other devices. Further, the Internet of Things (IoT) provides a network of numerous types of devices that may connect with more typical computer devices. These devices may be embedded with, for example, electronics, sensors, and network connectivity.

Electronic devices, such as IoT devices may collect massive amounts of data that must be sorted and aggregated. Collected data may be beneficial when analyzed. For example, predictive analysis, anomaly detection, outlier detection all have application that could improve security, health, quality of life, targeted advertising, among other applications. However, the tradeoff for collecting and analyzing data from devices is that user privacy may be compromised. Removing identifying information from sensor data may render the data difficult to characterize, and may result in the addition of noise and inaccuracies in the analysis.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computer system" can refer to a single computer or a plurality of computers working together to perform the function described as being performed on or by a computer system.

As used herein, the term "medium" refers to a single physical medium or a plurality of media that together store what is described as being stored on the medium.

As used herein, the term "network device" can refer to any computer system that is capable of communicating with another computer system across any type of network.

In one or more embodiments, a technique is provided for collection and protecting sensor data, and extracting values from the sensor data. In one or more embodiments, a device may include a number of sensors. The device may receive sensor data from the sensors. In one or more embodiments, the sensors may be part of the device, or may be operatively connected to the device. The device may automatically tag the sensor data. In one or more embodiments, the device accesses standardized tags for data from the particular sensor and selects a tag for the data based on characteristics of the data. Because the sensor data is tagged at the source prior to being sanitized of identifying information, the selection of the tag may be more accurate than tagging the data at a remote source after identifying information is removed. In one or more embodiments, the device may append the tag to the sensor data to generate a sensor data packet. The sensor data packet may then be transmitted to an intermediary device, which can then aggregate the data.

In one or more embodiments, the intermediary device may apply a user-specific policy to the aggregated sensor data, such as removing certain identifying information. The intermediary device may also use the user-specific policy to determine how each type of information may be shared.

Figure 1:
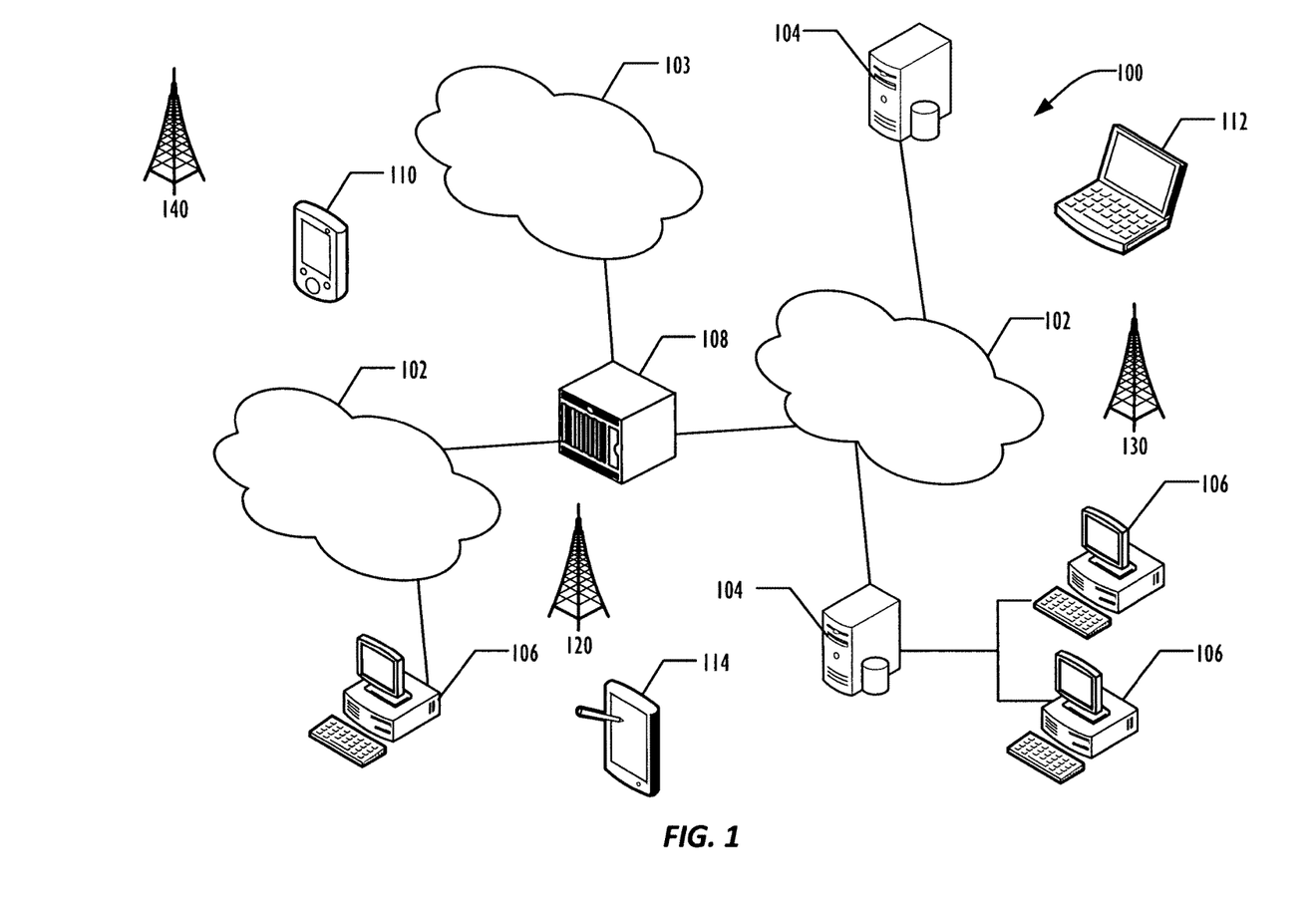
FIG. 1 is a diagram illustrating a network of programmable devices according to one or more embodiments.

Referring to the figures, FIG. 1 an example infrastructure 100 in which embodiments may be implemented is illustrated schematically. Infrastructure 100 contains computer networks 102. Computer networks 102 may include many different types of computer networks available today, such as the Internet, a corporate network, or a Local Area Network (LAN). Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Each of the networks 102 may contain a number of other devices typically referred to as Internet of Things (microcontrollers, embedded systems, industrial control computing modules, etc.). Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services. The functionality of the gateway device 108 may be implemented in any device or combination of devices illustrated in FIG. 1; however, most commonly is implemented in a firewall or intrusion protection system in a gateway or router.

Figure 2:
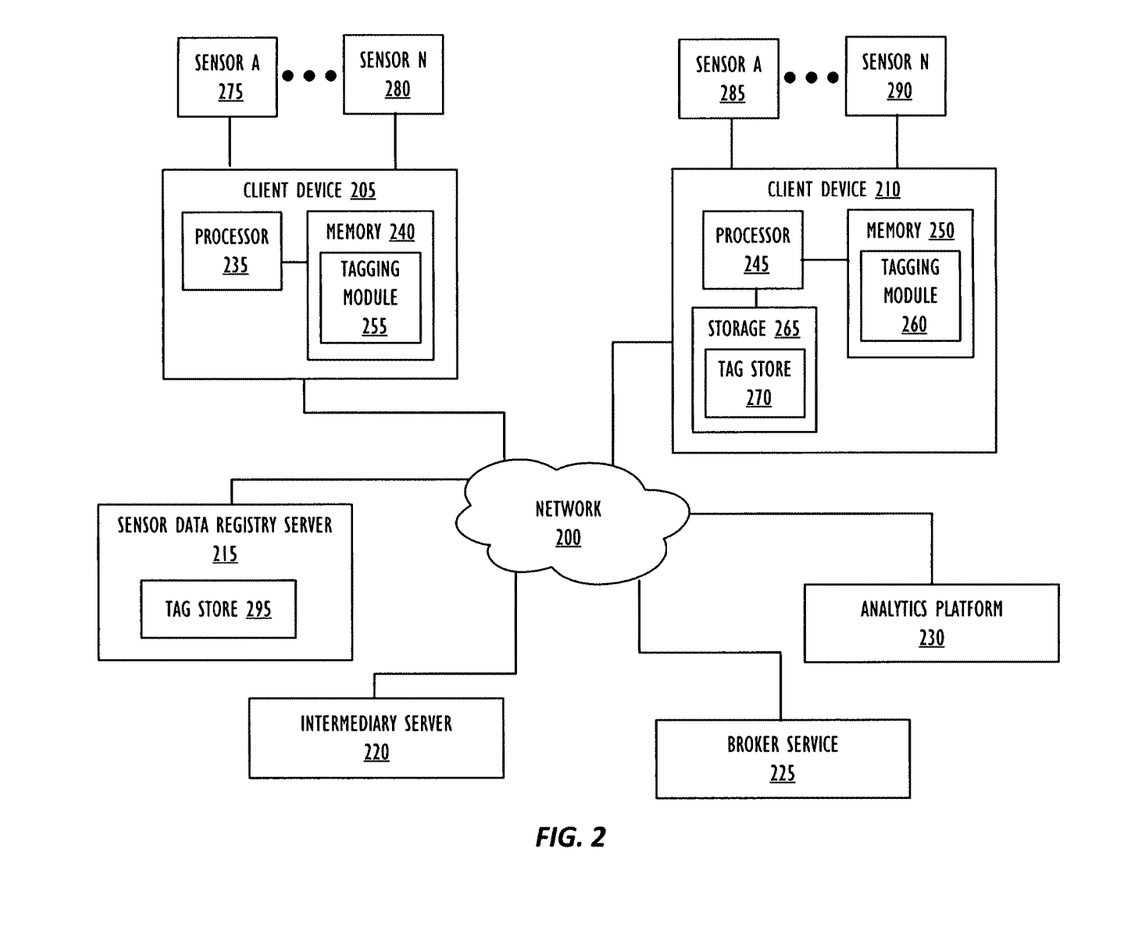
FIG. 2 is a system diagram illustrating a network diagram for the collection, protection, and aggregation of sensor data, according to one or more embodiments.

FIG. 2 is a diagram illustrating a system for sensor data collection, protection, and value extraction, according to one or more embodiments. FIG. 2 includes several devices connected across network 200. As depicted, network 200 may connect such computer systems as client device 205, client device 210, sensor data registry server 215, intermediary server 220, broker service 225, and analytics platform 230. In one or more embodiments, the functionality of the various components may be differently distributed than the particular depiction of FIG. 2. Network 200 may be any type of computer network, such as a LAN or a corporate network, including a plurality of interconnected networks. For example, Network 200 may include a subset of the devices included in larger network 102 or 103.

In one or more embodiments, the client device 205 may be a computer device with numerous components. Further, in one or more embodiments, the client device 205, as depicted, may be a more constricted device, and have only bare bones components, such as a processor 235 and memory 240. Processor 235 and memory 240 may be operatively connected, for example, over a bus. In one or more embodiments, memory 240 may include software executable by the processor 235, such as a tagging module 255. In one or more embodiments, the tagging module 255 generates sensor data packets by appending a standardized tag to the sensor data. The standardized tags may be obtained from a sensor tag registry server 215. In one or more embodiments, the client device 205 may be operative connected to one or more sensors, such as sensors 275-280. Sensors 275-280 may include any kind of sensor utilized to gather data. For example, sensors 275-280 may include accelerometers, thermometers, gyrometers, cameras or other light sensors, pressure sensors, altimeters, heart rate monitors, oximetry sensors, skin conductance sensors, geolocation, compass, and the like.

Client device 210 depicts an alternate client device that is less constricted than client device 205. Client device 210 includes a processor 245 along with a memory 250 and a storage 265. The processor 245, memory 250 and storage 265 may be connected, for example, over a bus. As described above, with respect to client device 205, memory 250 may include a tagging module 260 that generates sensor data packets by appending a standardized tag to the sensor data. Client device 210 may be preloaded with tags from the sensor data registry server 215, for example. Tags may be preloaded in a tag store 270 in storage 265.

Client device 210 may include or be operatively connected to one or more sensors 285-290. Sensors 285-290 may include any kind of sensor utilized to gather data. For example, sensors 285-290 may include accelerometers, thermometers, gyrometers, cameras or other light sensors, pressure sensors, altimeters, heart rate monitors, oximetry sensors, skin conductance sensors, geolocation, and the like. Tagging modules 255 and 260 may encrypt the sensor data packets prior to transmitting them to a next location, such as intermediary server 220. In one or more embodiments, encryption may be performed by utilizing a locally generated key. For example, either of client devices 205 and 210 may include an application-specific integrated circuit (ASIC) configured to generate keys. Further, either of client devices 205 and 210 may include a secure enclave or a trusted execution environment configured to generate keys for encryption of the sensor data packet. Although only two client devices 205 and 210 are illustrated in FIG. 2, any number of client devices may be deployed. Additionally, client devices 205 and 210 may include other components than those illustrated in FIG. 2.

Sensor data registry server 215 may provide a central location for the storage of standardized tags to be used by various sensors of devices and computer systems. Sensor data registry server 215 may provide a standardized tagging registry, such as tag store 295, which provides tags for data values generated by sensors. The tags may identify the classification of the sensor data. The tags may be utilized by an origin endpoint, such as client device 205 or client device 210 automatically. The tags may be categorized by a type of data, or by a sensor producing the data. For example, the tags may indicate that a sensor data packet includes temperature in degrees Fahrenheit, temperature in degrees Celsius, angular speed in degrees per second, or the like. In one or more embodiments, the sensor data registry server 215 may provide tags to the client devices 205 and 215 depending on the type of sensor the client device is receiving data from. For example, if sensor A 275 is a thermometer, then sensor data registry server 215 may provide tags for "temperature in degrees Fahrenheit" and "temperature in degrees Celsius," but not "angular speed in degrees per second."

Once the sensor data packets are generated, the client devices 205 and 210 may transmit the sensor data packets to intermediary server 220. Intermediary server 220 may be a computer system that processes, sanitizes, aggregates, anonymizes, and applies a user-specific policy to sensor data packets received from client device 205 and client device 210. In one or more embodiments, intermediary server 220 may collect sensor data packets associated with more than one user. For example, the sensors associated with client device 205 may collect data corresponding to a first user, whereas the sensors corresponding to client device 210 may collect data corresponding to a second user. In one or more embodiments, the intermediary server 220 may include a user-specific policy indicating how the user corresponding to the data wishes the data to be processed. For example, the user may indicate that data from an accelerometer may be aggregated, whereas data from a thermometer may not. Further, in one or more embodiments, the user-specific policy may indicate how the sensor data may be shared. For example, the user-specific policy may indicate that the sensor data for that user may be shared with healthcare platforms, but not with platforms associated with the automotive industry. In one or more embodiments, users may provide user-specific policy information directly to the intermediary server. In one or more embodiments, the user-specific policy information may be received from another device, such as client device 205, client device 210, or another device communicatively connected to the intermediary server 220 and providing a user interface through which a user may provide user-specific policy information.

Once the intermediary server aggregates and sanitizes the data packets, the aggregated data may be transmitted to a broker service 225. In one or more embodiments, broker service 225 reads metadata in the aggregated data to determine how the aggregated data may be shared. In one or more embodiments, the aggregated data may be encrypted. The broker service 225 may obtain a key to decrypt the aggregated data, for example, from a key service. The broker service 225 may then forward the aggregated data to the relevant platforms, such as analytics platform 230, according to the specification within the aggregated data. For example, data regarding how the sensor data may be shared may be found in metadata for the aggregated data. In one or more embodiments, the aggregated data may be transmitted after being encrypted, for example, using a key from a key service. In one or more embodiments, the aggregated sensor data may be transmitted to the platform such that the aggregated data includes metadata including user-specific policy information. The metadata may be encrypted separately from the payload such that decrypting the metadata indicates whether decryption of the payload is allowed. In one or more embodiments, separately encrypting the metadata and payload may prevent accidental or intentional abuse of the sensor data. In one or more embodiments, keys that provide access to the sensor data values are provisioned only if the platform is allowed access to the data by the user-specific policy, which is specified in the metadata.

Figure 3:
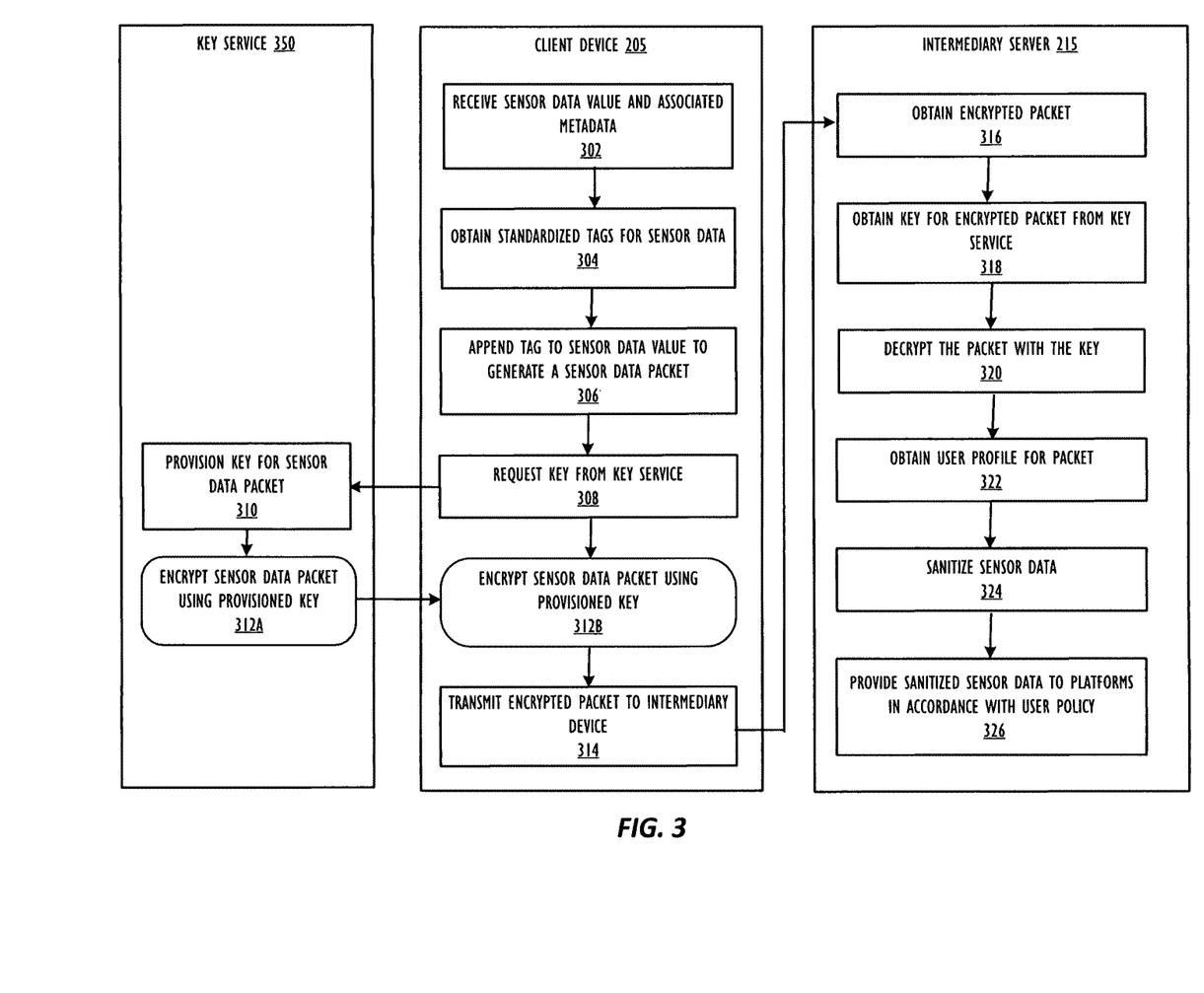
FIG. 3 is a flow diagram illustrating a method for providing sanitized senor data to various platforms, according to one or more embodiments.

FIG. 3 is a flow diagram illustrating a technique for sensor data collection, protection, and value extraction. In one or more embodiments, the various steps of the flow diagram may occur in various devices, such as client device 205, intermediary server 215, and key service 350, along with other devices, such as those depicted in FIG. 2. Although the various steps are depicted in a particular order, and performed by particular components, in one or more embodiments, the various steps may be performed in a different order. Further, in one or more embodiments, steps may be omitted or added, or performed by different components than those depicted in FIG. 3.

The flow diagram begins at 302, and client device 205 receives, from a sensor, a sensor data value. In one or more embodiments, the sensor data value may be received with associated metadata. In one or more embodiments, the metadata may include a unique identifier corresponding to the particular sensor data, or the particular device (such as client device 205), or a category of the data. For example, the metadata may indicate a high-level data type, such as health records, location tracking data, fitness data, energy consumption, electricity consumption, water meter readings, and the like.

The flow diagram continues at 304, and the client device 205 obtains standardized tags for the received sensor data. In one or more embodiments, a tagging module in the client device may obtain the tags from a local store, such as tag store 270 if the tags have been preloaded. For example, sensor data registry server 215 may provide the tags based on sensor A 275 through sensor N 280 included as part of, or operatively connected to client device 205. Further, in one or more embodiments, the tags may be provided on demand, for example, by sensor data registry server 215. As another example, the tags may be provisioned during manufacture of the client device 205, for example, based on the sensors included in the client device. Further, as another example, if the client device 205 determines that no tag is stored locally that correlates to the sensor data, then the client device 205 may request additional tags from the sensor data registry server 215. Further, the tag store 270 may occasionally, or periodically, be updated with new or updated tags. The client device 205 may have direct connectivity to the registry service. As another example, the client device 205 may utilize an IoT Web Gateway to route the connection.

The flow diagram continues at 306 and the client device 205 appends the proper tag to the sensor data to generate a sensor data packet. In one or more embodiments, the client device 205 selects and appends the tag automatically, without further user input. In one or more embodiments, the client device 205 may select the proper tag based on the type of data generated by the sensor. In one or more embodiments, the client device 205 considers the context of the data when selecting the tag. For example, the device may receive the data from a sensor that captures temperature data. The client device 205 may also know that the sensor from which the device was receives measures temperature in Fahrenheit, even though the fact that the sensor measures temperature in Fahrenheit is not provided within the sensor data. Thus, the client device 205 may append a tag indicating that the sensor data value correlates to "temperature in degrees Fahrenheit."

The flow diagram continues at 308, and the client device 205 may optionally request a key from a key service 350 to encrypt the generated sensor data packet. In one or more embodiments, the client device 205 may alternatively generate the key locally, for example using an ASIC, or a key generation module within a secure enclave or a trusted execution environment. The flow diagram continues at 310, and a key service 350 provisions a key for the sensor data packet. Optionally, at 312A, the key service 220 may also encrypt the sensor data packet with the provisioned key. For example, if client device 205 is a constricted device and does not have the capability to perform encryption, the encryption could be performed by 220. Alternatively, at 312B, the sensor data packet would be encrypted by the client device 205. In one or more embodiments, at 312B the sensor data packet may be encrypted, for example, within a secure enclave or a trusted execution environment within the client device 205. The key may be stored, for example, by the key service 350 for use by other devices to decrypt the sensor data packet. The flow diagram continues at 314 and the client device 205 transmits the encrypted sensor data packet to the intermediary device 215.

The flow diagram continues at 316, and the intermediary server 215 obtains the encrypted packet. At 318, the intermediary server 215 obtains the key for the encrypted packet from the key service 350. In one or more embodiments, the intermediary server can identify the key needed based on, for example, metadata for the sensor data packet. At 320, the intermediary server 215 decrypts the sensor data packet with the key to decrypt the sensor values.

The flow diagram continues at 322 and the intermediary server 215 obtains a user-specific policy for the packet. For example, the data collected from the sensor may be regarding a particular user, which may be a user of the device that includes the sensor. At 324, the intermediary server 215, aggregates and sanitizes the sensor data according to the user-specific policy. As described above, the user-specific policy may be received from a user either directly at the intermediary device, or through another device, such as client device 205 or client device 210. The user-specific policy may indicate how the user corresponding to the data wishes the data to be processed, and may indicate how the sensor data should be sanitized. For example, the user-specific policy may indicate what identifying data should be removed from sensor data packets based on a type of sensor data, or the destination of the sensor data. In addition, the user-specific policy may also indicate monetization information for the data. For example, the user-specific policy can indicate that heartrate data should only be shared if the user will be paid for the data. The user may also specify that certain data should be monetized only for certain destinations. For example, a user may have configured that some sensor data should be made freely available to health care providers, but may also choose to share it freely to Alzheimer's research, and only for monetization purposes for the automotive industry. At 326, the intermediary server 215 shares the sanitized sensor data to platforms in accordance with the user-specific policy. In one or more embodiments, the intermediary server 326 may consult the metadata received from the sensors to determine which platforms should receive the sensor data. For example, health records may be sent to a doctor, but should not be sent elsewhere.

Although not depicted, in one or more embodiments, once the sanitized sensor data is received by a platform, such as analytics platform 230, the platform may extract the relevant sensor value. In one or more embodiments, the platform may have some identifying data, based on the user-specific policy. In one or more embodiments, the platform may also obtain a key to decrypt the sensor data from the key service 350. As described above, the metadata may be encrypted separately from the payload such that decrypting the metadata indicates whether decryption of the payload is allowed. In one or more embodiments, separately encrypting the metadata and payload may prevent accidental or intentional abuse of the sensor data. In one or more embodiments, keys that provide access to the sensor data values are provisioned only if the platform is allowed access to the data by the user-specific policy, which is specified in the metadata.

Referring now to FIG. 6, a block diagram illustrates a programmable device 600 that may be used within a computer device, such as client device 205, client device 210, sensor data registry server 215, or any other computer system described above in accordance with one or more embodiments. The programmable device 600 illustrated in FIG. 6 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 6 may be implemented as a multi-drop bus rather than point-to-point interconnects.

As illustrated in FIG. 6, each of processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-5. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 6 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 6, various I/O devices 614, 624 may be coupled to first link 616, along with a bridge 618 which may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 620.

Note that other embodiments are contemplated. For example, instead of the point-to-point architecture of FIG. 6, a system may implement a multi-drop bus or another such communication topology. Although links 616 and 620 are illustrated as busses in FIG. 6, any desired type of link may be used. Also, the elements of FIG. 6 may alternatively be partitioned using more or fewer integrated chips than illustrated in FIG. 6.

Referring now to FIG. 7, a block diagram illustrates a programmable device 700 according to another embodiment. Certain aspects of FIG. 6 have been omitted from FIG. 7 in order to avoid obscuring other aspects of FIG. 7.

FIG. 7 illustrates that processing elements 770, 780 may include integrated memory and I/O control logic ("CL") 772 and 782, respectively. In some embodiments, the 772, 782 may include memory control logic (MC) such as that described above in connection with FIG. 6. In addition, CL 772, 782 may also include I/O control logic. FIG. 7 illustrates that not only may the memories 732, 734 be coupled to the 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 7 as processor cores 774A, 774B, 784A, and 784B. As illustrated in FIG. 7, I/O subsystem 790 includes P-P interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

Figure 4:
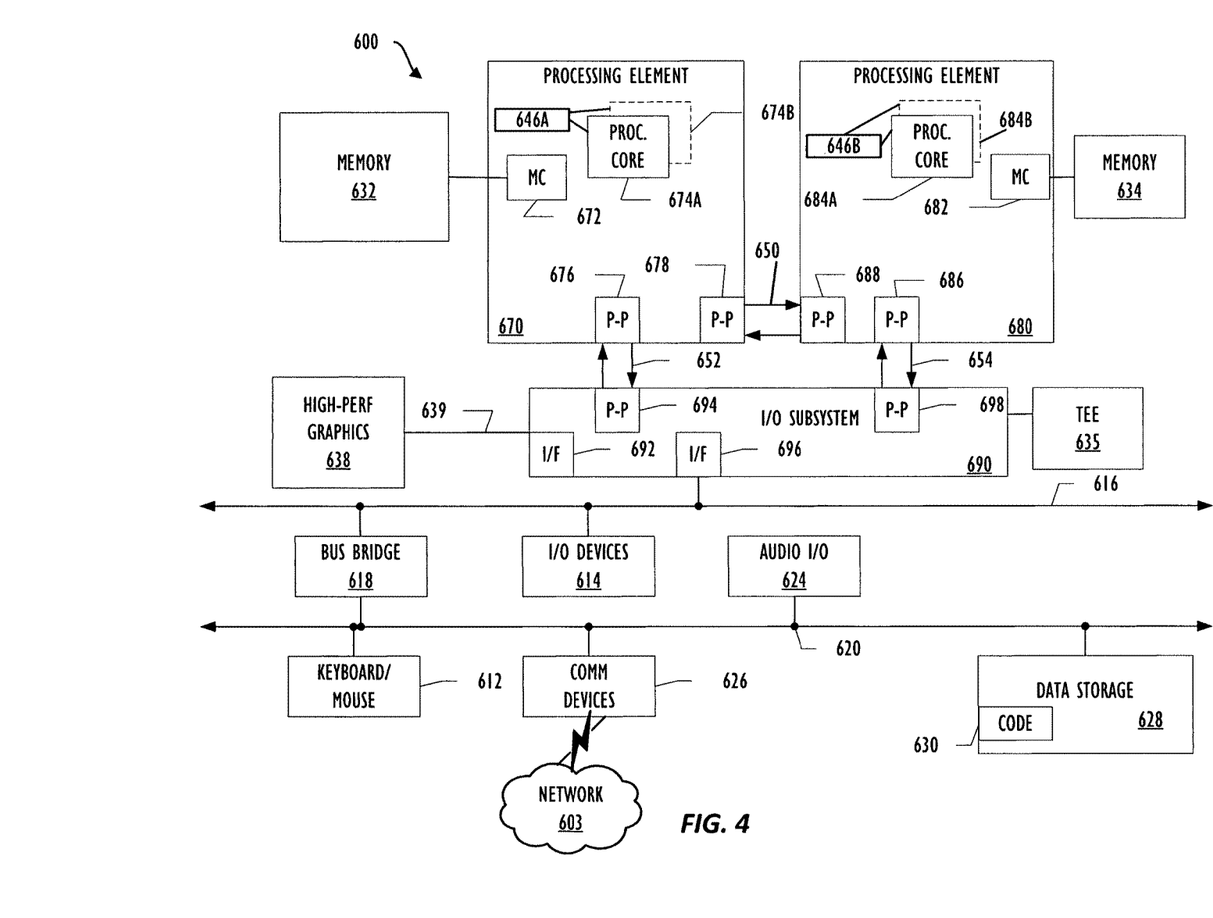
FIG. 4 is a diagram illustrating a computing device for use with techniques described herein according to one embodiment.
Figure 5:
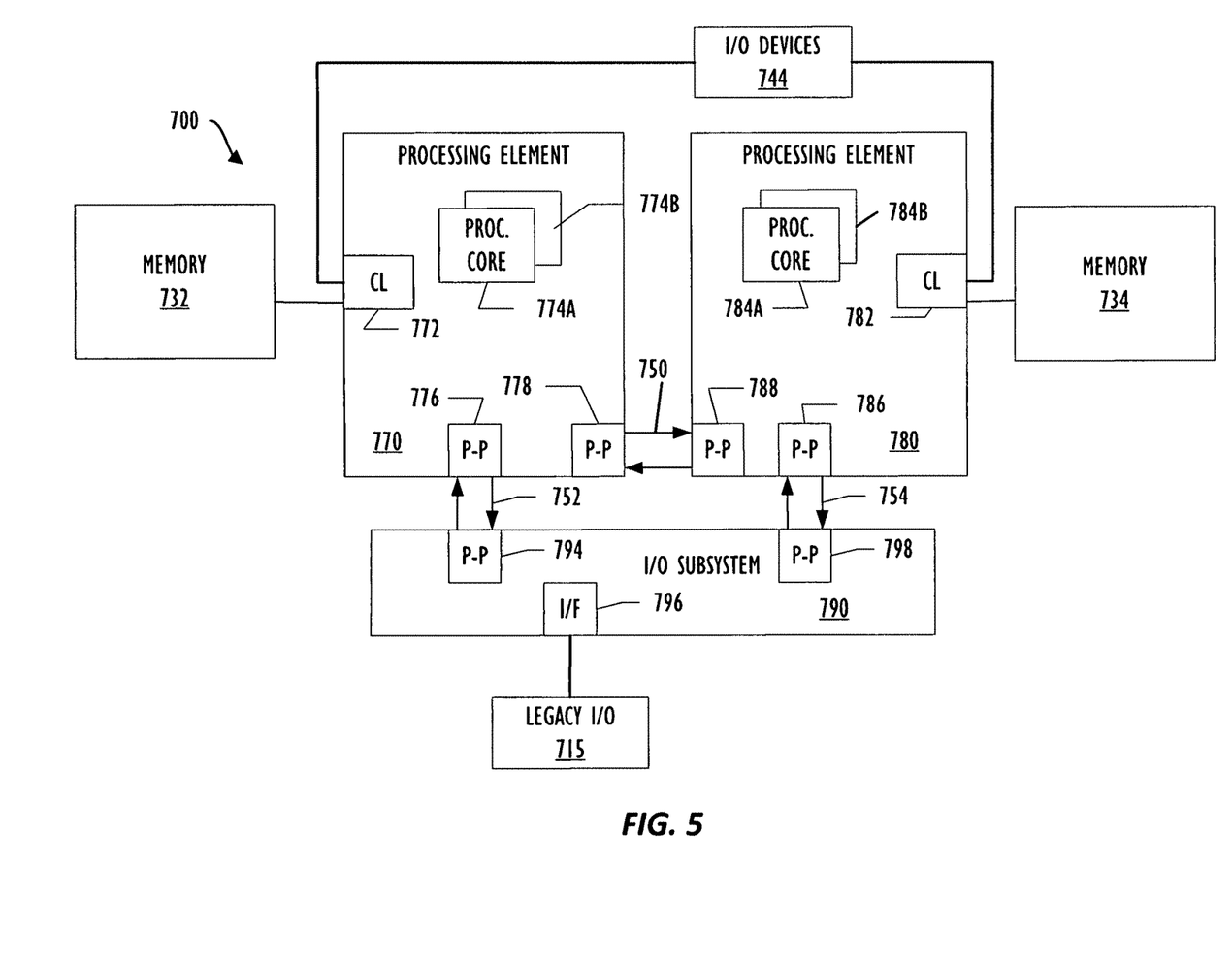
FIG. 5 is a block diagram illustrating a computing device for use with techniques described herein according to another embodiment.

The programmable devices depicted in FIGS. 4 and 5 are schematic illustrations of embodiments of programmable devices which may be utilized to implement various embodiments discussed herein. Various components of the programmable devices depicted in FIGS. 4 and 5 may be combined in a system-on-a-chip (SoC) architecture.

In one or more embodiments, the features described above provide a method and apparatus for sensor data collection, protection, and value extraction. In one or more embodiments, tagging the sensor data at the origin endpoint may provide more accurate classification of sensor data because the origin endpoint has more information regarding the sensor and context within which the data is being recorded than another entity. Utilizing the intermediary server that performs the aggregation and an anonymization before forwarding to an value extraction platform may result in better classification of sensor data. Further, utilizing a user-specific policy to control the data before the data is send to platforms may allow a user greater control over his or her own data.

It is to be understood that the various components of the flow diagrams described above, could occur in a different order or even concurrently. It should also be understood that various embodiments of the inventions may include all or just some of the components described above. Thus, the flow diagrams are provided for better understanding of the embodiments, but the specific ordering of the components of the flow diagrams are not intended to be limiting unless otherwise described so.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 is a machine readable medium on which instructions are stored, comprising instructions that when executed cause a machine to: receive, from an electronic device, a plurality of sensor data packets, wherein the plurality of sensor data packets are received from at least one sensor of the electronic device, and wherein each of the plurality of sensor data packets comprises a tag identifying a classification of sensor data in the sensor data packet; apply a user-specific policy to the plurality of sensor data packets; aggregate the plurality of sensor data packets based on the user-specific policy to obtain aggregated sensor data; and transmit the aggregated sensor data to a service broker.

In Example 2 the subject matter of Example 1 optionally includes wherein the electronic device obtains the tag identifying the classification of the sensor data from a sensor data tag registry service remote to the electronic device.

In Example 3 the subject matter of Example 2 optionally includes wherein the sensor data tag registry service comprises a plurality of standardized tags for categories of sensor data, and wherein the electronic device: identifies a plurality of tags based on the sensor from which the sensor data was received, and automatically selects the tag from the plurality of tags identifying the classification of the sensor data packet based on the classification of the sensor data.

In Example 4 the subject matter of any of Examples 1-3 optionally includes wherein the plurality of sensor data packets are encrypted using a key service, and wherein the instructions when executed further cause the machine to: obtain decryption information from the key service, and decrypt the plurality of sensor data packets using the decryption information.

In Example 5 the subject matter of Example 4 optionally includes wherein the key service is deployed remote to the electronic device.

In Example 6 the subject matter of any of Examples 1-3 optionally includes wherein the service broker provides the aggregated sensor data to a third party platform based on the user-specific policy.

Example 7 is a system for data aggregation comprising: one or more processors; and a machine readable medium coupled to the one or more processors on which instructions are stored, comprising instructions that when executed cause at least some of the one or more processors to: receive, from an electronic device, a plurality of sensor data packets, wherein the plurality of sensor data packets are received from at least one sensor of the electronic device, and wherein each of the plurality of sensor data packets comprises a tag identifying a classification of sensor data in the sensor data packet; apply a user-specific policy to the plurality of sensor data packets; aggregate the plurality of sensor data packets based on the user-specific policy to obtain aggregated sensor data; and transmit the aggregated sensor data to a service broker.

In Example 8 the subject matter of Example 7 optionally includes wherein the electronic device obtains the tag identifying the classification of the sensor data from a sensor data tag registry service remote to the electronic device.

In Example 9 the subject matter of Example 8 optionally includes wherein the sensor data tag registry service comprises a plurality of standardized tags for categories of sensor data, and wherein the electronic device: identifies a plurality of tags based on the sensor from which the sensor data was received, and automatically selects the tag from the plurality of tags identifying the classification of the sensor data packet based on the classification of the sensor data.

In Example 10 the subject matter of any of Examples 7-9 optionally includes wherein the plurality of sensor data packets are encrypted using a key service, and wherein the instructions further cause any of the one or more processors to: obtain decryption information from the key service, and decrypt the plurality of sensor data packets using the decryption information.

In Example 11 the subject matter of Example 10 optionally includes wherein the key service is deployed remote to the electronic device.

In Example 12 the subject matter of any of Examples 7-9 optionally includes wherein the service broker provides the aggregated sensor data to a third party platform based on the user-specific policy.

Example 13 is a method for data aggregation, comprising: receiving, from an electronic device, a plurality of sensor data packets, wherein the plurality of sensor data packets are received from at least one sensor of the electronic device, and wherein each of the plurality of sensor data packets comprise a tag identifying a classification of a sensor data in the sensor data packet; applying a user-specific policy to the plurality of sensor data packets; aggregating the plurality of sensor data packets based on the user-specific policy to obtain aggregated sensor data; and transmitting the aggregated sensor data to a service broker.

In Example 14 the subject matter of Example 13 optionally includes wherein the electronic device obtains the tag identifying the classification of the sensor data from a sensor data tag registry service remote to the electronic device.

In Example 15 the subject matter of Example 14 optionally includes wherein the sensor data tag registry service comprises a plurality of standardized tags for categories of sensor data, and wherein the electronic device: identifies a plurality of tags based on the sensor from which the sensor data was received, and automatically selects the tag from the plurality of tags identifying the classification of the sensor data packet based on the classification of the sensor data.

In Example 16 the subject matter of any of Examples 13-15 optionally includes wherein the plurality of sensor data packets are encrypted using a key service, and wherein the method further comprises: obtaining decryption information from the key service, and decrypting the plurality of sensor data packets using the decryption information.

In Example 17 the subject matter of Example 16 optionally includes wherein the key service is deployed remote to the electronic device.

In Example 18 the subject matter of any of Examples 13-15 optionally includes wherein the service broker provides the aggregated sensor data to a third party platform based on the user-specific policy.

Example 19 is a machine readable medium on which instructions are stored, comprising instructions that when executed cause a machine to: receive, at an electronic device, sensor data from a sensor operatively connected to the electronic device; automatically select a tag for the sensor data based on the sensor; appending the selected tag to the sensor data to generate a sensor data packet; and transmitting the sensor data packet to an intermediary device, wherein the intermediary device aggregates sensor data from the electronic device.

In Example 20 the subject matter of Example 19 optionally includes wherein the instructions that cause a machine to automatically select a tag for the sensor data based on the sensor further comprise instructions which cause the machine to: obtain the tag from a sensor data tag registry service remote to the electronic device.

In Example 21 the subject matter of Example 20 optionally includes wherein the sensor data tag registry service comprises a plurality of standardized tags for categories of sensor data, and wherein the instructions further cause the machine to: receive a plurality of tags based on the sensor from which the sensor data was received, and automatically select the tag identifying a classification of the sensor data packet based on a classification of the sensor data.

In Example 22 the subject matter of any of Examples 19-21 optionally includes further comprising instructions which cause the machine to: obtain an encryption key from a key service, and encrypt the sensor data packet using the encryption key.

In Example 23 the subject matter of Example 22 optionally includes wherein the key service is deployed in a computer device remote to the electronic device.

Example 24 is a method for data aggregation, comprising: receiving, at an electronic device, sensor data from a sensor operatively connected to the electronic device; automatically selecting a tag for the sensor data based on the sensor; appending the selected tag to the sensor data to generate a sensor data packet; and transmitting the sensor data packet to an intermediary device, wherein the intermediary device aggregates sensor data from the electronic device.

In Example 25 the subject matter of Example 24 optionally includes further comprising: obtaining the tag from a sensor data tag registry service remote to the electronic device.

In Example 26 the subject matter of Example 25 optionally includes wherein the sensor data tag registry service comprises a plurality of standardized tags for categories of sensor data, and wherein the method further comprises: receiving a plurality of tags based on the sensor from which the sensor data was received, and automatically selecting the tag identifying a classification of the sensor data packet based on a classification of the sensor data.

In Example 27 the subject matter of any of Examples 24-26 optionally includes further comprising: obtaining an encryption key from a key service, and encrypting the sensor data packet using the encryption key.

In Example 28 the subject matter of Example 27 optionally includes wherein the key service is deployed in a computer device remote to the electronic device.

Example 29 is a system for data aggregation comprising: one or more processors; and a machine readable medium coupled to the one or more processors on which instructions are stored, comprising instructions that when executed cause at least some of the one or more processors to: receive, at an electronic device, sensor data from a sensor operatively connected to the electronic device; automatically select a tag for the sensor data based on the sensor; appending the selected tag to the sensor data to generate a sensor data packet; and transmitting the sensor data packet to an intermediary device, wherein the intermediary device aggregates sensor data from the electronic device.

In Example 30 the subject matter of Example 29 optionally includes wherein the instructions that cause a machine to automatically select a tag for the sensor data based on the sensor further comprise instructions which cause the machine to: obtain the tag from a sensor data tag registry service remote to the electronic device.

In Example 31 the subject matter of Example 30 optionally includes wherein the sensor data tag registry service comprises a plurality of standardized tags for categories of sensor data, and wherein the instructions further cause the machine to: receive a plurality of tags based on the sensor from which the sensor data was received, and automatically select the tag identifying a classification of the sensor data packet based on a classification of the sensor data.

In Example 32 the subject matter of any of Examples 29-31 optionally includes further comprising instructions which cause the machine to: obtain an encryption key from a key service, and encrypt the sensor data packet using the encryption key.

In Example 33 the subject matter of Example 32 optionally includes wherein the key service is deployed in a computer device remote to the electronic device.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiment will be apparent to those of skill in the art upon reviewing the above description. The scope of the invention should therefore should be determined with reference to the appended claims, along with the full scope of equivalents to which such claims are entitled.

What is claimed is:

1. A non-transitory machine readable medium on which instructions are stored, comprising instructions that when executed cause a machine to:
   receive, from an electronic device at an intermediary server, a plurality of sensor data packets, wherein the plurality of sensor data packets are received from at least one sensor of the electronic device, and wherein each of the plurality of sensor data packets comprises a tag appended to sensor data that identifies a classification of sensor data in the sensor data packet, the classification identifying a type of data included in the sensor data packet;
   process the plurality of sensor data packets in accordance with a user-specific policy to obtain processed sensor data, the user-specific policy identifying a plurality of processing steps based on each type of information in each of the plurality of sensor data packets, the processing steps including:
      sanitizing a first data packet to remove identifying information when the user-specific policy indicates to sanitize a first type of information in the first data packet;
      aggregating data from a second data packet with data from additional data packets to obtain aggregated sensor data when the user-specific policy indicates to aggregate a second type of information in the second data packet;
      anonymizing data from a third data packet when the user-specific policy indicates to anonymize personal information based on a third type of information in the third data packet; and
      monetizing data from a fourth data packet when the user-specific policy indicates to identify monetization information for a fourth type of information in the fourth data packet;
   and
   transmit the processed sensor data to a remote service broker device in accordance with the user-specific policy.

2. The non-transitory machine readable medium of claim 1, wherein the electronic device obtains the tag that identifies the classification of the sensor data from a sensor data tag registry service remote to the electronic device.

3. The non-transitory machine readable medium of claim 2, wherein the sensor data tag registry service comprises a plurality of standardized tags for categories of sensor data, and wherein the electronic device:
   identifies a plurality of tags based on the sensor from which the sensor data was received, and
   automatically selects the tag, from the plurality of tags, that identifies the classification of the sensor data packet based on the classification of the type of data included in the sensor data.

4. The non-transitory machine readable medium of claim 1, wherein the plurality of sensor data packets are encrypted using a key service, and wherein the instructions when executed further cause the machine to:
   obtain decryption information from the key service, and
   decrypt the plurality of sensor data packets using the decryption information prior to processing the plurality of sensor data packets to obtain processed sensor data.

5. The non-transitory machine readable medium of claim 4, wherein the key service is deployed remote to the electronic device.

6. The non-transitory machine readable medium of claim 1, wherein the remote service broker device provides the processed sensor data to a third party platform based on the user-specific policy.

7. A system for data aggregation comprising:
   one or more processors; and
   a non-transitory machine readable medium coupled to the one or more processors on which instructions are stored, comprising instructions that when executed cause at least some of the one or more processors to:
      receive, from an electronic device, a plurality of sensor data packets, wherein the plurality of sensor data packets are received from at least one sensor of the electronic device, and wherein each of the plurality of sensor data packets comprises a tag appended to sensor data that identifies a classification of sensor data in the sensor data packet, the classification identifying a type of data included in the sensor data packet;
      process the plurality of sensor data packets in accordance with a user-specific policy to obtain processed sensor data, the user-specific policy identifying a plurality of processing steps based on each type of information in each of the plurality of sensor data packets, the processing steps including:
         sanitizing a first data packet to remove identifying information when the user-specific policy indicates to sanitize a first type of information in the first data packet;
         aggregating data from a second data packet with data from additional data packets to obtain aggregated sensor data when the user-specific policy indicates to aggregate a second type of information in the second data packet;
         anonymizing data from a third data packet when the user-specific policy indicates to anonymize personal information based on a third type of information in the third data packet; and
         monetizing data from a fourth data packet when the user-specific policy indicates to identify monetization information for a fourth type of information in the fourth data packet; and transmit the processed sensor data to a remote service broker device in accordance with the user-specific policy.

8. The system of claim 7, wherein the electronic device obtains the tag that identifies the classification of the sensor data from a sensor data tag registry service remote to the electronic device.

9. The system of claim 8, wherein the sensor data tag registry service comprises a plurality of standardized tags for categories of sensor data, and wherein the electronic device:
identifies a plurality of tags based on the sensor from which the sensor data was received, and
automatically selects the tag, from the plurality of tags, that identifies the classification of the sensor data packet based on the classification of the type of data included in the sensor data.

10. The system of claim 7, wherein the plurality of sensor data packets are encrypted using a key service, and wherein the instructions further cause any of the one or more processors to:
obtain decryption information from the key service, and
decrypt the plurality of sensor data packets using the decryption information prior to processing the plurality of sensor data packets to obtain processed sensor data.

11. The system of claim 10, wherein the key service is deployed remote to the electronic device.

12. The system of claim 7, wherein the remote service broker device provides the processed sensor data to a third party platform based on the user-specific policy.

13. A method for data aggregation, comprising:
receiving, from an electronic device at an intermediary server, a plurality of sensor data packets, wherein the plurality of sensor data packets are received from at least one sensor of the electronic device, and wherein each of the plurality of sensor data packets comprise a tag appended to sensor data that identifies a classification of a sensor data in the sensor data packet, the classification identifying a type of data included in the sensor data packet;
processing the plurality of sensor data packets in accordance with a user-specific policy to obtain processed sensor data, the user-specific policy identifying a plurality of processing steps based on each type of information in each of the plurality of sensor data packets, the processing steps including:
sanitizing a first data packet to remove identifying information when the user-specific policy indicates to sanitize a first type of information in the first data packet;
aggregating data from a second data packet with data from additional data packets to obtain aggregated sensor data when the user-specific policy indicates to aggregate a second type of information in the second data packet;
anonymizing data from a third data packet when the user-specific policy indicates to anonymize personal information based on a third type of information in the third data packet; and
monetizing data from a fourth data packet when the user-specific policy indicates to identify monetization information for a fourth type of information in the fourth data packet; and
transmitting the processed sensor data to a remote service broker device in accordance with the user-specific policy.

14. The method of claim 13, wherein the electronic device obtains the tag that identifies the classification of the sensor data from a sensor data tag registry service remote to the electronic device.

15. The method of claim 14, wherein the sensor data tag registry service comprises a plurality of standardized tags for categories of sensor data, and wherein the electronic device:
identifies a plurality of tags based on the sensor from which the sensor data was received, and
automatically selects the tag, from the plurality of tags, that identifies the classification of the type of data included in the sensor data packet based on the classification of the sensor data.

16. The method of claim 13, wherein the plurality of sensor data packets are encrypted using a key service, and wherein the method further comprises:
obtaining decryption information from the key service, and
decrypting the plurality of sensor data packets using the decryption information prior to processing the plurality of sensor data packets to obtain processed sensor data.

17. The method of claim 16, wherein the key service is deployed remote to the electronic device.

18. The method of claim 13, wherein the remote service broker device provides the processed sensor data to a third party platform based on the user-specific policy.

19. A non-transitory machine readable medium on which instructions are stored, comprising instructions that when executed cause a machine to:
receive, at an electronic device, sensor data from a sensor operatively connected to the electronic device;
automatically select a tag from a plurality of tags identifying classification of the sensor data, the selection of the tag based on the sensor and a type of data included in the sensor data;
append the selected tag to the sensor data to generate a sensor data packet containing the sensor data and the selected tag, the selected tag identifying a classification of the sensor data in the sensor data packet, the classification identifying the type of data included in the sensor data; and
transmit the sensor data packet to an intermediary device, wherein the intermediary device processes sensor data from the electronic device in accordance with a user-specific policy associated with the sensor data packet, wherein the user-specific policy identifies a plurality of processing steps based on the classification of the sensor data, the processing steps including:
sanitizing a first data packet to remove identifying information when the user-specific policy indicates to sanitize a first type of information in the first data packet;
aggregating data from a second data packet with data from additional data packets to obtain aggregated sensor data when the user-specific policy indicates to aggregate a second type of information in the second data packet;
anonymizing data from a third data packet when the user-specific policy indicates to anonymize personal information based on a third type of information in the third data packet; and monetizing data from a fourth data packet when the user-specific policy indicates to identify monetization information for a fourth type of information in the fourth data packet.

20. The non-transitory machine readable medium of claim 19, wherein the instructions that cause a machine to automatically select the tag for the sensor data based on the sensor further comprise instructions which cause the machine to:

automatically select the tag by obtaining the selected tag from a sensor data tag registry service remote to the electronic device.

21. The non-transitory machine readable medium of claim 20, wherein the sensor data tag registry service comprises a plurality of standardized tags for categories of sensor data, and wherein the instructions further cause the machine to:

receive a plurality of standardized tags based on the sensor from which the sensor data was received, and automatically select the tag identifying the classification of the sensor data packet based on the classification of the sensor data, from the plurality of standardized tags.

22. The non-transitory machine readable medium of claim 19, further comprising instructions which cause the machine to:

obtain an encryption key from a key service, and encrypt the sensor data packet using the encryption key, prior to transmitting the sensor data packet to an intermediary device.

23. The non-transitory machine readable medium of claim 22, wherein the key service is deployed in a computer device remote to the electronic device.

* * * * *